United States Patent
Steffier (10) Patent No.: US 7,479,302 B2
(45) Date of Patent: Jan. 20, 2009

(54) ACTIVELY-COOLED FIBER-REINFORCED CERAMIC MATRIX COMPOSITE ROCKET PROPULSION THRUST CHAMBER AND METHOD OF PRODUCING THE SAME

(76) Inventor: Wayne S. Steffier, 735 Alabama St., Huntington Beach, CA (US) 92648

( * ) Notice: Subject to any disclaimer, the term of this patent is extended or adjusted under 35 U.S.C. 154(b) by 1002 days.

(21) Appl. No.: 10/865,772

(22) Filed: Jun. 14, 2004

(65) Prior Publication Data
US 2004/0222571 A1    Nov. 11, 2004

Related U.S. Application Data

(60) Division of application No. 10/039,991, filed on Jan. 8, 2002, now Pat. No. 6,783,824, and a continuation-in-part of application No. 09/772,108, filed on Jan. 25, 2001, now abandoned.

(51) Int. Cl.
*C23C 16/00* (2006.01)
(52) U.S. Cl. ............... 427/248.1; 427/249.1; 427/249.2; 427/249.5; 427/255.12
(58) Field of Classification Search .............. 427/249.1, 427/249.2, 255.12, 248.1, 249.5
See application file for complete search history.

(56) References Cited

U.S. PATENT DOCUMENTS 5,455,106 A  * 10/1995  Steffier .................. 442/72
5,523,133 A  *  6/1996  Smith ..................... 428/34.4
5,545,435 A  *  8/1996  Steffier .................. 427/249.3
6,151,887 A  * 11/2000  Haidn et al. ............. 60/257

* cited by examiner

*Primary Examiner*—Binh X Tran
(74) *Attorney, Agent, or Firm*—Morland C. Fischer (57) ABSTRACT

An actively-cooled, fiber-reinforced ceramic matrix composite thrust chamber for liquid rocket propulsion systems is designed and produced with internal cooling channels. The monocoque tubular structure consists of an inner wall, which is fully integrated to an outer wall via radial coupling webs. Segmented annular void spaces between the inner wall, outer wall and adjoining radial webs form the internal trapezoidal-shaped cooling channel passages of the tubular heat exchanger. The manufacturing method enables producing any general tubular shell geometry ranging from simple cylindrical heat exchanger tubes to complex converging-diverging, Delaval-type nozzle structures with an annular array of internal cooling channels. The manufacturing method allows for transitioning the tubular shell structure from a two-dimensional circular geometry to a three-dimensional rectangular geometry. The method offers the flexibility of producing internal cooling channels of either constant or continuously variable cross-sectional area, in addition to orienting the cooling channels either axially, helically or sinusoidally (e.g., undulating) with respect to the longitudinal axis of the tubular shell structure with without significant added manufacturing complication.

28 Claims, 9 Drawing Sheets

ACTIVELY-COOLED FIBER-REINFORCED CERAMIC MATRIX COMPOSITE ROCKET PROPULSION THRUST CHAMBER AND METHOD OF PRODUCING THE SAME

CROSS-REFERENCE TO RELATED APPLICATIONS

This application is a division of application Ser. No. 10/039,991 filed Jan. 8, 2002, now U.S. Pat. No. 6,783,824, and is a continuation-in-part (CIP) of application Ser. No. 09/772,108 filed Jan. 25, 2001 and now abandoned.

BACKGROUND OF THE INVENTION

1. Field Of The Invention

The present invention relates to actively-cooled tubular shell structures for high-temperature applications having a plurality of cooling channels formed between the inner wall and outer wall of the structure wherein the structure is fabricated from fiber-reinforced ceramic matrix composite materials and methods of producing same.

2. Background Art

Performance of advanced chemical rocket technology is limited, for the most part, by the availability of high-temperature structural engineering materials. Greater performance and efficiency in liquid rocket propulsion systems can be gained by operating at higher combustion temperatures and higher working pressures resulting from highly energetic propellant mixture ratios (oxidizer/fuel). However, propellant mixtures are typically "tamed" to off-optimum conditions in order not to exceed the temperature limitations of the thrust chamber and nozzle materials.

A considerable amount of heat is transferred in all designs of rocket engines. The principle objective of high-temperature rocket design is to safely limit the heat transfer to the materials in critical hot sections such as the injector, combustion chamber, throat, and nozzle. A failure would impair the satisfactory operation of the rocket propulsion system or the flight vehicle being propelled. The walls have to be maintained sufficiently cool so that wall temperatures do not exceed their safe allowable operating limit. Erosion, usually the result of combined oxidation and chemical interaction with the hot combustion gases, should not damage the walls, and the walls should be capable of withstanding the extreme thermal shock caused by the sudden onset of a high heat flux from combustion ignition. The materials comprising the thrust chamber devices must also be capable of resisting the thermal stresses induced by the heat transfer and thermal gradients.

There are two general cooling methods commonly used today in the design of liquid propellant rocket engine devices. Those devices that reach thermal equilibrium during operation typically operate for long durations and are usually either actively-cooled (e.g., bipropellants) or radiation cooled (e.g., monopropellants).

Actively-cooled liquid propellant thrust chambers have provisions for cooling some or all of the components in contact with the hot combustion gases, such as the chamber walls, nozzle walls and injector faces. A cooling jacket or cooling coil often consists of separate inner and outer walls or a bundled assembly of continuous, contoured tubes. The inner wall confines the combustion gases, and the space between the inner and outer walls serves as the coolant passage. The axial or helical passages in liquid propellant rocket thrust chambers are often of complex cross-section. The nozzle throat region is usually the location that sustains the greatest heat transfer intensity and is therefore the most difficult to cool. For this reason the cooling jacket is often designed so that the coolant velocity is highest at the critical regions by restricting the coolant passage cross-section and so that the coolant enters the jacket at or near the nozzle.

Regenerative cooling is a form of active cooling and is used for engines where one of the propellant constituents is circulated through cooling passages around the thrust chamber prior to injection and burning of the propellant in the combustion chamber. Regenerative cooling in bipropellant engines uses either the fuel or oxidizer as the cooling fluid. Therefore, the thermal energy absorbed by the coolant is not wasted as it augments the initial energy content of the propellant prior to injection, thereby increasing the exhaust velocity and propulsive performance.

Radiation cooling is typically used in monopropellant thrust chambers, some gas generators and for nozzle exhaust sections. Radiation cooling is a simple, lightweight cooling method, which is commonly employed in low-temperature rocket engines, such as hydrazine (monopropellant) spacecraft maneuver and attitude control systems, where the maximum chamber temperature is only about 650° C. Refractory metals such as molybdenum, tantalum, tungsten, and niobium have been used in radiation cooled thrust chambers requiring increased operating temperatures up to 1650° C. Refractory metals are, however, difficult to fabricate and some suffer from hydrogen embrittlement degradation; others oxidize readily and thus require protective surface coatings to function reliably; all are weight inefficient due to their very high specific gravities. Radiation cooled thrust chambers generally have to protrude beyond the outer skin of the flight vehicle to permit satisfactory radiative heat rejection.

In general, ceramics have superior high-temperature strength and stiffness, and lower density than metallic materials. The principal disadvantages of ceramics as structural materials are their low failure strain, low fracture toughness and catastrophic brittle failure characteristics. Because of these inherent limitations, monolithic ceramics lack the properties of reliability and durability that are necessary for structural design acceptance. However, the emerging technology of fiber-reinforced ceramics, or ceramic matrix composites is one promising solution for overcoming the reliability and durability problems associated with monolithic ceramics. By incorporating high strength, relatively high modulus fibers into brittle ceramic matrices, combined high strength and high toughness composite materials can be obtained. Successfully manufactured ceramic matrix composites exhibit a high degree of non-linear stress-strain behavior with ultimate strengths, failure strains and fracture toughnesses that are substantially greater than that of the unreinforced matrix.

In order to exploit the benefits of fiber reinforcement in brittle ceramic matrices, it is well recognized that a relatively weak fiber/matrix interfacial bond strength is essential for preventing catastrophic failure from propagating matrix cracks. The interface must provide sufficient fiber/matrix bonding for effective load transfer, but must be weak enough to debond and slip in the wake of matrix cracking, leaving the fibers to bridge the cracks and support the far-field applied load. Fiber-reinforced ceramic matrix composites with very high fiber/matrix interfacial bond strengths (usually the result of chemical interaction during manufacture) exhibit brittle failure characteristics similar to that of unreinforced monolithic ceramics by allowing matrix cracks to freely propagate directly through the reinforcing fibers. Conversely, by reducing the interfacial bond strength, the fiber and matrix are able to debond and slip promoting the arrest and/or diversion of propagating matrix cracks at/or around the reinforcing fiber.

Since crack inhibition/fracture toughness enhancement is the primary advantage of fiber-reinforced ceramic matrix composites, properly engineered fiber coating systems are thus key to the structural performance of these materials. Control of interfacial bonding characteristics between the fiber and matrix following manufacture and during service is typically provided by the use of applied fiber coatings.

Fiber-reinforced ceramic matrix composites produced by the chemical vapor infiltration (CVI) process are a particularly promising class of engineered high-temperature structural materials, which are now commercially available. The principal advantage of the CVI process approach for fabricating ceramic matrix composites as compared to other manufacturing methods (e.g., reaction bonding, hot-pressing, melt infiltration, or polymer impregnation/pyrolysis) is the ability to infiltrate and densify geometrically complex, multidirectional fibrous preforms to near-net-shape with a ceramic matrix of high purity and controllable stoichiometry without chemically, thermally or mechanically damaging the relatively fragile reinforcing fibers. In addition, because it is a relatively low temperature manufacturing process, high purity refractory matrix materials can be formed (deposited) at a small fraction of their melting temperature ($\sim T_m/4$). Despite the many possible high-temperature ceramic matrix composite material systems, however, the number of practical systems is limited by the currently available reinforcing fibers. To date, the majority of high performance ceramic matrix composites produced have focused primarily on carbon and polymer-derived SiC (Nicalon and Hi-Nicalon) fiber reinforcement and CVI-derived SiC matrices.

Carbon fiber-reinforced silicon carbide (C/SiC) and silicon carbide fiber-reinforced silicon carbide (SiC/SiC) composites produced by CVI have been identified by the aerospace and propulsion communities (both in the United States and in Europe) as an important enabling materials technology for thermostructural applications demanding high strength and toughness at temperatures to 1650° C. The high purity CVI-SiC matrix is not readily attacked by either hydrogen-rich or oxidizing environments up to 1650° C., and resists oxidation by the formation of an adherent and protective oxide surface scale. Along with being chemically compatible with a variety of commercially available refractory fiber reinforcements, SiC possess excellent thermal shock resistance due to its combination of very high thermal conductivity (50-100 W/mK) and low thermal expansivity (4.5 ppm/° C.). These thermophysical attributes are especially attractive for advanced rocket propulsion thrust chamber and exhaust nozzle applications.

Uncooled, single-walled rocket thrust chambers and nozzle components have been produced from fiber-reinforced ceramic matrix composites by a number of manufacturers. Material systems for these applications have included carbon fiber-reinforced carbon, or carbon/carbon (C/C), C/SiC and SiC/SiC composites produced by various manufacturing techniques, including CVI. In all cases, these rocket propulsion devices were fabricated as a simple, single-wall shell construction and passively cooled by radiation.

Until now, actively-cooled reinforced ceramic matrix composite thrust chambers have neither been designed nor produced for various technical reasons, including the lack of conception of a practical design approach, the perceived high level of complexity for such a fiber-reinforced composite design, manufacturing difficulty, and high cost necessary to produce such a device.

SUMMARY OF THE INVENTION

In the present invention, a process is described for the design and manufacture of actively-cooled fiber-reinforced ceramic matrix composite tubular shell structures for high-temperature applications with emphasis on converging-diverging thrust chambers for liquid rocket propulsion systems.

Tubular shell structures are defined as any open-ended three-dimensional body with a central longitudinal axis wherein the body of the structure is enclosed by either curved surfaces, flat surfaces or combinations thereof.

Fiber-reinforcement is defined as any refractory fibers, either continuous or discontinuous, used for producing a fibrous preform texture, which are capable of withstanding a use temperature of at least 800° C. in an atmosphere which is thermochemically compatible with that fiber without suffering fundamental chemical, physical or mechanical degradation. Examples include carbon fibers, silicon carbide fibers, silicon nitride fibers, aluminum oxide fibers, etc.

A fiber preform is a fibrous texture defined as any assemblage of one or more reinforcing fiber types produced by weaving, braiding, filament winding, fiber placement, felting, needling, or other textile fabrication process.

Fiber preforming is a textile fabrication process by which the collimated multifilamentary fiber bundles (tows) are placed and maintained in a fixed position for purposes of controlling both their orientation and content within a given volumetric space. As such, the spatial arrangement of fibers is referred to as a preform architecture.

The braided architecture is one of the simplest and lowest cost fiber preforms for producing continuous fiber-reinforced axisymmetric, tubular structures. Although constructed of interlaced tows in a planar 2-dimensional arrangement similar to woven fabric, braiding offers the added flexibility of interlacing fiber in three (3) directions both axial and helical. The most common braid architecture consists of helical fibers interlaced at a prescribed bias angle and are termed biaxial braids. Fixed axial fibers can be inserted around the mandrel circumference in nearly any desired fraction with respect to the helical "braiders" to produce an architecture reinforced in three (3) discrete directions and are termed triaxial braids. Triaxially braided preforms offer certain benefits over biaxial architectures, such as the ability to tailor material isotropy or increase axial properties. In most cases, increased axial properties are gained at the cost of sacrificed circumferential "hoop" properties. However, the optimum braid architecture for a given application is usually designed and selected on the basis of the combined axial and hoop properties required. Triaxial preforms typically yield preforms with slightly lower fiber volume fractions than that of the biaxial braided architecture. This is due to the crimping and bunching of the fiber tows at the braid triple point, which results in increased braid layer thicknesses and larger internal voids.

Fiber coating is defined as any refractory composition of either carbon, metal carbide, metal nitride, metal boride, metal silicide, metal oxide, or combinations thereof which is (are) deposited (for example by chemical vapor infiltration) onto the refractory fibers either before or after fiber preforming for purposes of controlling the fiber/matrix interfacial bonding characteristics in the resultant composite. The resultant fiber coating thus encapsulates the reinforcing fibers. Examples include pyrolytic carbon, silicon carbide, silicon nitride, boron carbide, boron nitride, etc.; either as a single-layer phase, multilayered phase or as a phase of mixed composition.

Ceramic matrix is defined as any refractory composition of either carbon, metal carbide, metal nitride, metal boride, metal silicide, metal oxide, or combinations thereof which is subsequently deposited (for example by chemical vapor infiltration) onto the previously coated refractory fibers within the fibrous preform thereby encapsulating the fibers and consolidating the preform into the resultant densified composite. The reinforcing fibers of the fibrous preform thus become embedded within and supported by the surrounding matrix. Examples include pyrolytic carbon, silicon carbide, silicon nitride, boron carbide, boron silicide, etc., either as a single phase, multilayered phase or as a phase of mixed composition.

BRIEF DESCRIPTION OF THE DRAWINGS

FIG. 1(A-E) show one embodiment of an actively-cooled fiber-reinforced ceramic matrix composite tubular structure comprising an axisymmetric rocket propulsion thrust chamber of converging-diverging geometry.

FIG. 2(A-B) show a two-piece inner tooling mandrel suitable for defining the inner wall geometry of a converging-diverging thrust chamber wherein the mandrel is split and joined at the minimum cross-section (e.g., throat) for easy removal and reusability.

FIG. 4(A-B) show a base cooling channel tooling mandrel of compound converging-diverging geometry prior to segmenting (FIG. 4A) and following segmenting into a plurality of individual cooling channel tooling mandrel segments (FIG. 4B).

FIG. 5(A-D) show the assembly configuration of the plurality of individual cooling channel tooling mandrel segments disposed about the inner tooling mandrel.

DETAILED DESCRIPTION

Figures 1A, 1B, 1C, 1D, 1E:
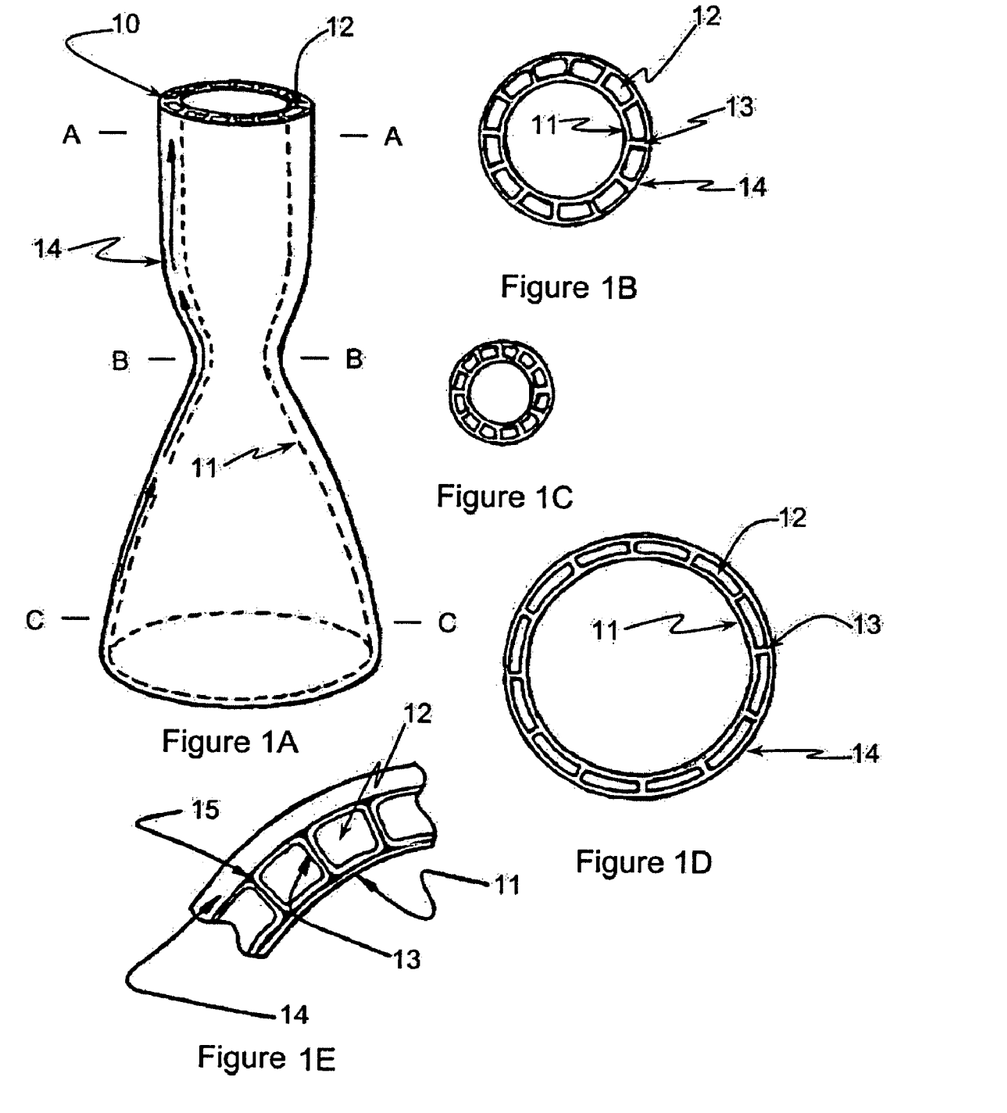

FIG. 1 shows one embodiment of an actively-cooled fiber-reinforced ceramic matrix composite tubular shell structure comprising an axisymmetric converging-diverging rocket propulsion thrust chamber 10. It can be appreciated that other tubular shell geometries (e.g., cylindrical tubes, conical tubes, rectangular tubes, etc.) can be fabricated with internal cooling channels without departing from the scope of the present invention. The basic structural arrangement of the actively-cooled thrust chamber 10 comprises three (3) fundamental sub-structural elements: an inner combustion chamber vessel wall 11, an annular array of integral cooling channels 12 each separated by periodically spaced radial coupling webs 13, and an outer primary pressure vessel wall 14. The inner vessel wall 11 functions as a "hot" liner in contact with and directing the flow of combustion gases produced during operation. The inner vessel wall 11 is preferably designed to be as thin as structurally possible and fabricated from a material possessing combined high thermal conductivity and high-temperature mechanical properties (e.g., strength, toughness and stiffness). A thin-wall inner shell 11 constructed of a high thermal conductivity material is preferred in order to maximize the transfer of thermal energy from the hot inner wall 11 to the cooling fluid passed through the cooling channel passages 12 during operation. A material with high-temperature strength and toughness is preferred because of the extreme high-temperatures and pressures imposed on the inner liner 11 by the combustion products.

In order to provide for active cooling of the thrust chamber structure 10 shown in FIG. 1, an annular array of embedded cooling channels 12 is provided. These channels 12 serve to contain and transport pressurized cooling fluid through the interior of the thrust chamber structure 10. Because it is desirable for the thermally effective surfaces of the cooling channels 12 to be in intimate contact with the hot inner wall 11 for maximum cooling efficiency, a trapezoidal-shaped cooling channel passage 12 cross-sectional geometry as shown in FIG. 1 is preferred in order to maximize the contact surface adjoining the inner wall 11 and the cooling fluid. It can be appreciated that other cooling channel geometries (e.g., circular) can be utilized for fabrication of the cooling channels without departing from the scope of the present invention. However, the trapezoidal-shaped cooling channel geometry 12 is preferable for the present application over that of circular based on: (1) providing the maximum wetted surface area per unit channel packing, resulting in the most efficient convective heat transfer (e.g., cooling) characteristics; (2) the ability to continuously vary the cooling channel cross-sectional area so as to passively control local coolant flow rates for optimal thermal control; (3) providing the greatest structural integrity via direct, linear load paths from the inner vessel wall 11 to the outer vessel wall 14; (4) minimizing channel-to-shell nesting voids 15, thereby minimizing interlaminar stresses and diminished heat transfer efficiency; (5) the ability to easily integrate the inner shell wall 11, outer shell wall 14 and cooling channel 12 components into a single monocoque assembly 10; and (6) the relative ease of manufacturing the geometrically-complex coolant channel tooling mandrels without the need for an elaborate and expensive multi-axis, numerically-controlled milling machine operation.

A plurality of discrete cooling channels 12 is preferred over an open annulus, dual-shell (e.g., cooling jacket) cooled structure design configuration. The array of individual cooling channel passages 12 aids to straighten the flow of the cooling fluid passed therethrough, thereby minimizing undesirable fluid mechanical effects (e.g., rotational flow), which can compromise the convective heat transfer efficiency of the heat exchanger.

The cooling channels 12 are separated from each other by periodically spaced radial web structures 13. The plurality of radial webs 13 serve to structurally couple the inner 11 and outer 14 vessel walls into a single integrated monocoque assembly 10. The webs 13 provide a direct radial load path from inner wall 11 to outer wall 14, which serves to increase the weight-specific structural efficiency of the overall thrust chamber vessel 10. The webs 13 also provide discrete radial thermal conduction pathways (e.g., radial cooling fins), which serve to increase the effectiveness of the convective heat exchanger.

The actively-cooled structure 10 is fabricated from a fiber-reinforced ceramic matrix composite material specially designed for high-temperature structural applications, such as rocket propulsion thrust chambers, burner tubes, heat exchangers, and other severe environment thermostructural components. The ceramic matrix composite material comprises a fibrous preform composed of an assemblage of refractory fibers, a fiber coating material encapsulating the refractory fibers, and a ceramic matrix material that consolidates the coated fibrous preform into a densified composite.

A first step in producing a near net-shape actively-cooled fiber-reinforced ceramic matrix composite tubular shell structure 10 in accordance with the present invention is the fabrication of tooling mandrels. The tooling mandrels serve to provide structural support and geometric definition of the fibrous preform, which will ultimately define the geometry of the resultant composite structure following fiber coating, matrix densification and mandrel removal.

Suitable tooling mandrel materials should be selected on the basis of several considerations: (1) thermochemical stability in the fiber coating and matrix densification processes; (2) thermochemical and thermomechanical compatibility with the preform reinforcing fiber; (3) thermophysical stability for maintaining desired component geometry during and following materials processing; (4) adequate structural integrity for handling the fibrous preform textile fabrication processes and subsequent preform assembly; (5) ease of removal; and (6) cost. Examples of suitable materials include graphite, molybdenum and stainless steel.

Figure 2A:
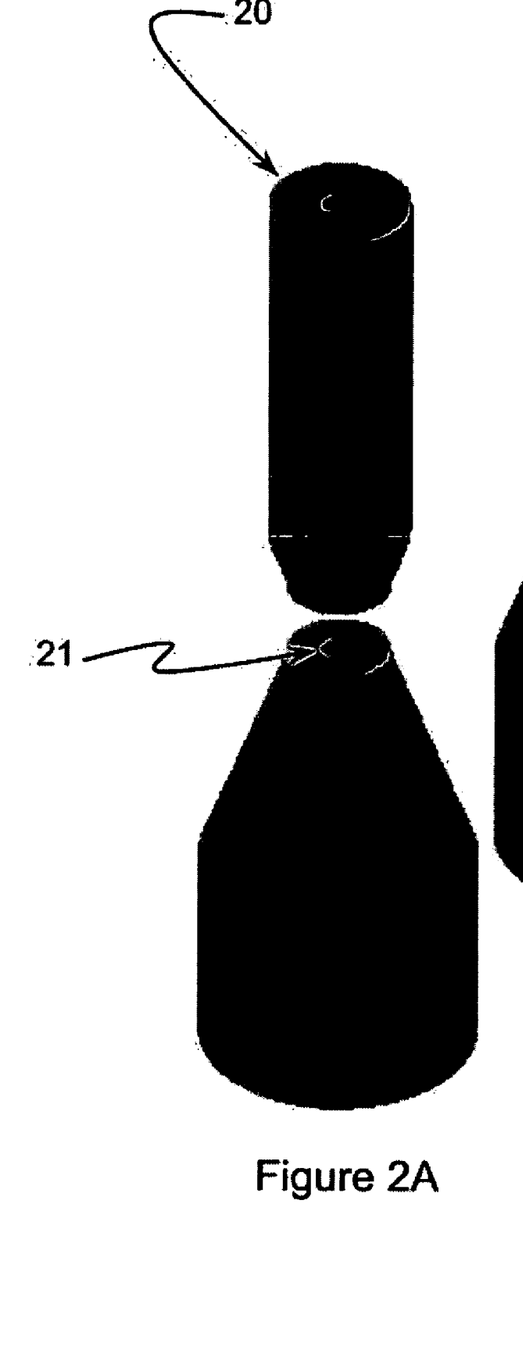
Figure 2B:
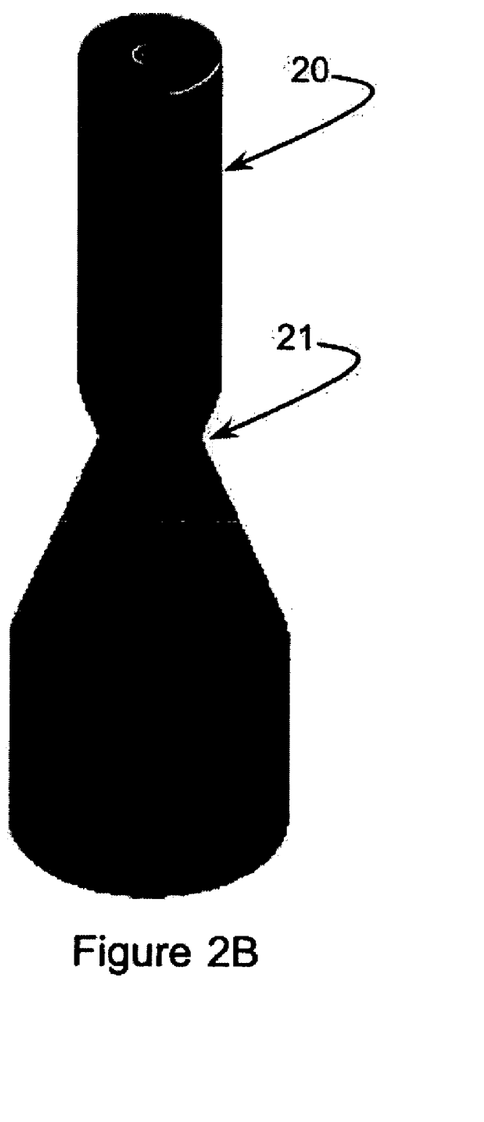

As a generalized example, the inner mold line (e.g., inner surface) of an axisymmetric converging-diverging ceramic matrix composite thrust chamber 10 as shown in FIG. 1 is produced and defined by an inner tooling mandrel. Because of its axisymmetry, this inner tooling mandrel can be fabricated using standard lathe turning techniques. Lathe machining of the converging-diverging chamber geometry from a suitable tooling material can be accomplished using a simple profile tracer template, numerical control, or other machining techniques well known in the art. FIG. 2 shows an example of a converging-diverging split inner tooling mandrel 20 suitable for use in fabricating the inner shell wall 11 of an actively-cooled ceramic matrix composite rocket propulsion thrust chamber 10.

For the example of a converging-diverging geometry, the inner tooling mandrel 20 can also be fabricated from two (2) segments, which can be split at the minimum cross-section 21 (e.g., throat) and mechanically joined by an axial bolted fastener to facilitate easy removal and reusability of the inner tooling mandrel 20. A simple actively-cooled cylindrical tube geometry on the other hand can be easily defined by a simple, single-piece cylindrical inner tooling mandrel of constant diameter along its length. Regardless of the final tubular geometry desired, excess length at either end of the inner tooling mandrel 20 may be desirable to accommodate certain fiber preforming methods, such as braiding, and subsequent fibrous preform assembly as will be described. In this event, any irregular and/or excess material at the ends of the densified composite structure can be trimmed and discarded following completed fabrication.

Following construction of an inner tooling mandrel 20 for defining the inner wall 11 geometry of the ceramic matrix composite tubular shell structure 10 to be produced, a fibrous preform of predetermined architecture and thickness is constructed onto the inner tooling mandrel 20 by a suitable textile fabrication process, such as braiding. The inner fiber preform forms the inner shell wall 11 sub-structure of the actively-cooled composite structure 10; thus, the preform architecture and preform thickness should be chosen with this design consideration in mind.

For increased resistance to damage or distortion sustained by subsequent handling, the fiber preform can be restrained onto the inner mandrel by hoop wrapping the excess ends with a suitable reinforced tape or string, as these ends may eventually be trimmed away and discarded.

The inner mold line of the array of annularly arranged cooling channel passages 12 within the composite structure 10 are produced and defined by individual tooling mandrel segments. The number of cooling channels passages 12, their corresponding orientation (e.g., axial, helical or sinusoidal), and cross-sectional area properties are selected based on satisfying the combined structural, thermal and fluid mechanical requirements of the actively-cooled structure as determined from design.

Figure 3:
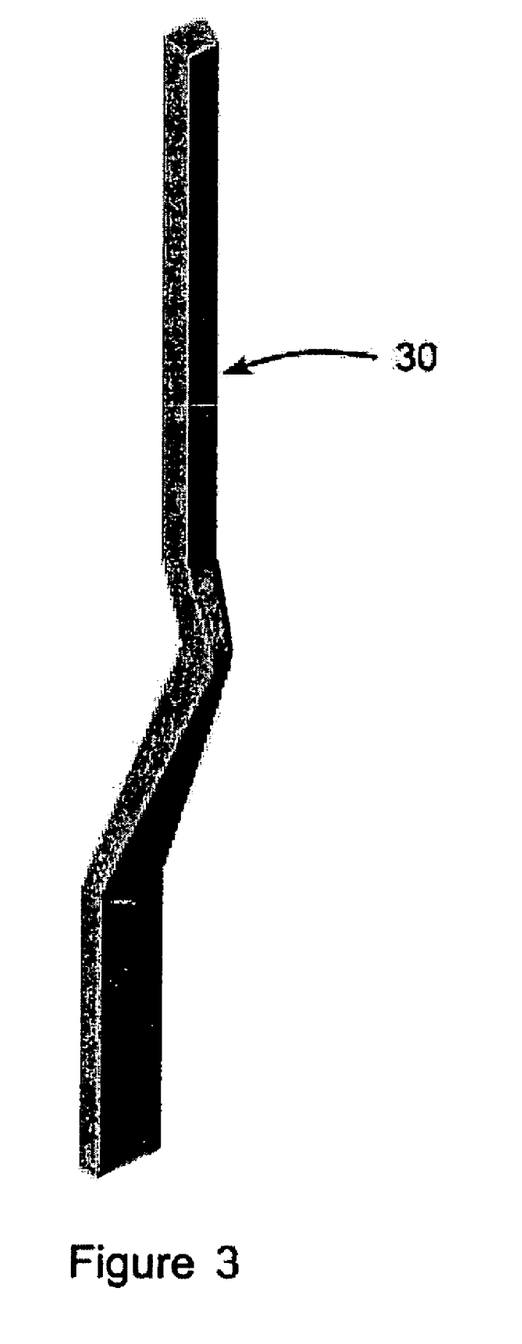
FIG. 3 shows one configuration of a single axial cooling channel tooling mandrel segment suitable for defining the internal cooling channel passage of an actively-cooled tubular structure of converging-diverging geometry.

Once a suitable design configuration for the cooling channels has been selected, individual cooling channel mandrel segments are then fabricated in accordance to this selection. FIG. 3A shows an example of a single axial cooling channel mandrel segment 30 suitable for use in fabricating an actively-cooled fiber-reinforced ceramic matrix composite thrust chamber 10 of general converging-diverging geometry. Fabrication of a plurality of individual tooling mandrels 30 having the complex convoluted geometry shown in FIG. 3 would normally require sophisticated (e.g., numerically controlled) multi-axis mill machining. Fabrication of helical or sinusoidally undulating channel tooling mandrels would be even more complex. The present invention, however, describes a greatly simplified manufacturing technique for fabricating the geometrically complex cooling channel mandrel segments 30 necessary for producing an actively-cooled ceramic matrix composite converging-diverging thrust chamber 10 or other enclosed tubular structure.

In the present invention, a "base" cooling channel tooling mandrel corresponding to the selected geometry of the cooling channel passages 12 to be produced within the structure is fabricated from a suitable tooling material using standard lathe turning and mill or saw cutting techniques. Selection of a suitable tooling material for the fabrication of the base cooling channel mandrel is important, as previously described, and must also take into consideration the process to be used for subsequent removal of the individual tooling mandrel segments, which may become embedded or intimately attached following the matrix densification of the actively-cooled ceramic matrix composite structure. As discussed below, graphite is a suitable choice for fabrication of the base cooling channel mandrel as it may be subsequently removed using conventional techniques (e.g., bead blasting) without damaging the surrounding ceramic matrix composite structure. Other tooling materials may also be appropriate and are discussed below.

Figures 4A, 4B:
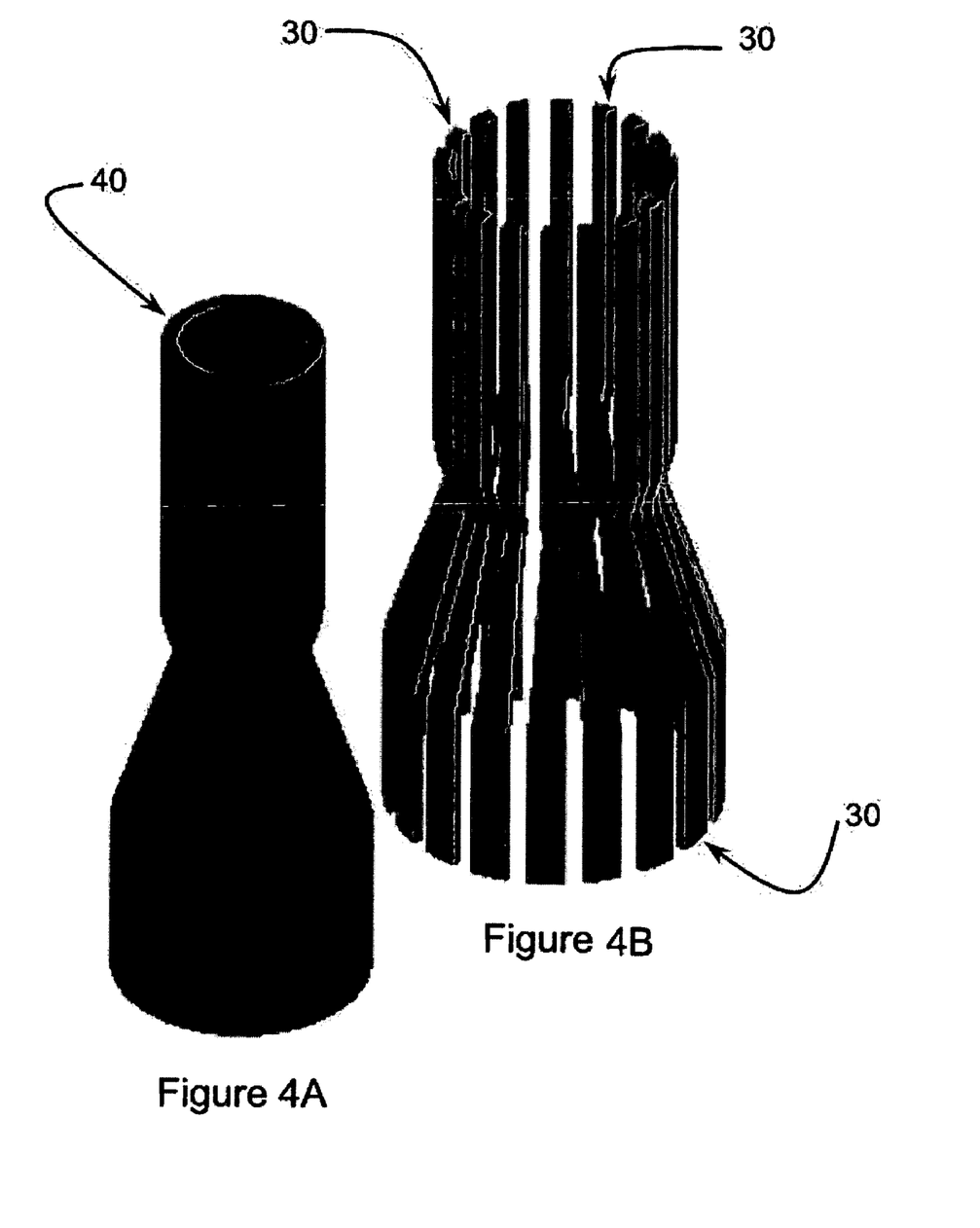

The base cooling channel tooling mandrel for an axisymmetric converging-diverging cylindrical geometry (e.g., actively-cooled thrust chamber) is fabricated by machining the outer diameter of the selected tooling material with a desired profile, which does not necessarily have to correspond to the profile of the inner mandrel 20 previously described. Following machining of the outer profile, an inner profile is then produced onto the mandrel which directly corresponds to the geometric profile of the inner mandrel 20. The difference between the inner and outer diameters of the base cooling channel mandrel ultimately defines the cooling channel passage cross-sectional area as will be described below. FIG. 4A shows a suitable base cooling channel mandrel 40 for producing the individual cooling channel mandrels 30 of a converging-diverging thrust chamber structure 10 as described above. With reference to FIG. 4A, the resultant base cooling channel mandrel 40 for a converging-diverging thrust chamber 10 comprises a hollow tubular shell structure having compound inner and outer converging-diverging profiles. As previously described, the inner and outer profiles of the base cooling channel mandrel 40 can be independent of one another and will thus form the desired cross-sectional geometry of the internal cooling passages 12. The inner profile of the base mandrel 40 is designed to geometrically conform to the profile of the inner mandrel 20 with prescribed radial accommodation (e.g., relief or gap) for the thickness of fiber preforms, which are ultimately produced over the respective inner mandrel 20 and individual cooling channel mandrels 30 following their fabrication. Thus, the radial dimensions of the inner mandrel 20 and the internal contour of the base mandrel 40 differ only by the fiber preform thickness desired along the length of the respective tools, and ultimately in the completed composite structure.

Following fabrication of the inner and outer profiles, the compound converging-diverging base mandrel 40 as shown in FIG. 4A is then cut into the desired axial, helical or sinusoidal segments using conventional cutting saw or vertical milling machining techniques. The resultant cut segments thus produce the individual cooling channel mandrels 30 which are used to form the internal cooling channel passages 12 of the actively-cooled ceramic matrix composite structure 10. FIG. 4B shows a converging-diverging base cooling channel mandrel 40 that has been cut axially into individual cooling channel tooling mandrel segments 30.

The cutting process for fabricating the individual cooling channel mandrel segments 30 from the base mandrel 40 is preferably performed by using a prescribed kerf, or cut width in order to control the desired thickness of the fibrous preform that, as described below, will eventually be produced onto and formed by the individual cooling channel tooling mandrel segments 30. The appropriate kerf width for cutting the cooling channel mandrel segments 30 from the base mandrel 40 should be approximately twice the desired fibrous preform thickness to be produced on each channel mandrel. This is to accommodate the cumulative preform thickness build-up from adjoining cooling channel mandrel segments upon their assembly and compaction. The cumulative preform thickness between each adjoining cooling channel fiber preform following their annular assembly forms the array of radial coupling webs 13 of the actively-cooled ceramic matrix composite structure 10.

For axially oriented channels 12, the individual cooling channel mandrel segments 30 are produced simply by a systematic process of longitudinal cutting followed by rotational indexing of the base mandrel 40 at discrete angular intervals. The angular indexing interval (360-degrees/n) is selected based on the number of like cooling channels (n) desired. This systematic process of cutting and indexing is repeated until the entire base mandrel shell 40 is cut into the desired number of equal segments 30. FIG. 4B shows an example of a plurality of axially-oriented cooling channel mandrel segments 30 produced from a single compound converging-diverging base cooling channel mandrel 40 as is shown in FIG. 4A.

For helically oriented channels, the individual cooling channel mandrel segments may be produced by simultaneously rotating the base cooling channel mandrel 40 about its longitudinal axis while cutting. The rate of angular rotation combined with the rate of longitudinal cutting is synchronized to produce the desired helical cut path. Following each helical cut, the base cooling channel mandrel 40 is rotationally indexed as previously described and the cutting process is repeated in manner similar to that of axially aligned cooling channel mandrel segments 30.

For sinusoidally undulating channels, the individual cooling channel mandrel segments are produced by simultaneously undulating the base cooling channel mandrel 40 about its longitudinal axis in a cyclic rotational or back-and-forth motion while cutting. The rate of the rotational reversal while cutting ultimately defines the amplitude of the undulating individual cooling channel mandrel segments produced. The rate of longitudinal cutting is thus synchronized to produce the desired sinusoidal period, or wavelength. Following each sinusoidal cut, the base cooling channel mandrel 40 is rotationally indexed and the cutting process is repeated in a manner similar to that of axially aligned cooling channel mandrel segments 30.

To aid in ease of fabricating the cooling channel tooling mandrel segments, it is best not to fully cut the entire length of the base mandrel 40 during segmenting of the individual cooling channel mandrels 30 as the remaining uncut base mandrel 40 becomes flexible and awkward to handle and accurately index during machining. By retaining short uncut lengths at both ends of the base mandrel 40 during cutting, the base mandrel 40 remains circumferentially rigid and adequately stabilized by the remaining uncut portion of the attached individual cooling channel mandrel segments 30. After completion of cutting all cooling channel mandrel segments 30, the uncut ends of the base cooling channel mandrel 40 are then cut perpendicular to the longitudinal axis of the base mandrel 40 and discarded, thereby freeing all the individual cooling channel mandrel segments 30. The final length of the individual cooling channel mandrel segments 30 is therefore shortened by the length of the discarded trim material. Thus, the base mandrel 40 can be made longer to accommodate this subsequent end trimming method. As-machined sharp edges on the individual cooling channel mandrel segments 30 can be removed by chamfering if necessary. Chamfering aids in minimizing potential fiber damage from abrasion during fiber preform fabrication. Although beneficial for fiber preforming, excessive chamfering can cause excessive preform nesting assembly voids 15 in the resultant composite structure 10.

Figures 5A, 5B, 5C, 5D:
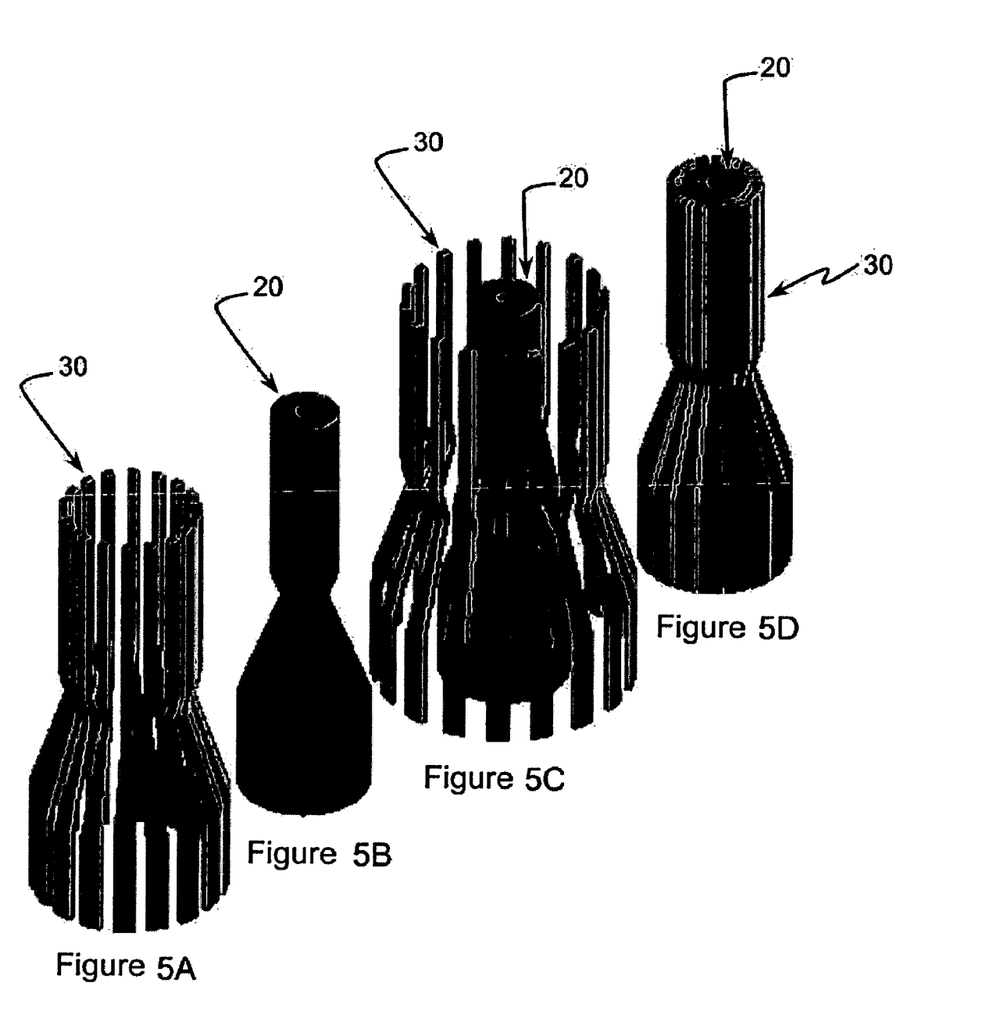

FIG. 5 shows the assembly form of individual cooling channel mandrel segments 30 disposed around an inner tooling mandrel 20 for producing an actively-cooled ceramic matrix composite thrust chamber 10 of converging-diverging geometry in accordance with the present invention (axial cooling channel design shown without fibrous preform for illustration). As shown in FIG. 5, a predetermined machining kerf has been chosen to allow for circumferential relief (e.g., gaps) between each adjacent cooling channel mandrel segment 30 in order to form the radial coupling webs 13. Radial relief between the inner surface of the individual cooling channel mandrel segments 30 and the adjacent inner tooling mandrel 20 is also provided in order to form the inner vessel wall 11. It is important that these relief features be designed in accordance with the selected thickness of the fibrous preforms subsequently produced onto the individual cooling channel mandrel segments 30 and the inner tooling mandrel 20 for proper assembly. For example, a kerf of greater than twice the preform thickness on the individual cooling channel mandrel segments 30 will result in producing a composite with excessive nesting voids 15, whereas a kerf of less than twice the preform thickness on the individual cooling channel mandrel segments 30 will result in undesirable assembly interference. Significant assembly interference can result in producing a composite with either insufficient inner wall fiber volume fraction or delamination between the inner wall 11 and adjoining cooling channels 12, which can significantly diminish both the structural and thermal performance of the resultant actively-cooled ceramic matrix composite structure 10.

Following cooling channel mandrel fabrication, a fibrous preform of predetermined architecture and thickness is then produced onto each of the individual mandrel segments 30 by a suitable preform fabrication process, such as braiding.

Having an overlaid fiber preform, the individual cooling channel tooling mandrel segments 30 are then assembled around the perimeter of the inner tool mandrel 20 in an annular array. As described previously, the inner tooling mandrel 20 has already been overlaid with its own inner fibrous preform. The individual cooling channel mandrel segments 30 are preferably held into position and compacted against the inner fibrous preform radially and against themselves circumferentially to obtain the desired preform thickness in the inner wall 11 and radial webs 13, respectively. Control of these thicknesses via tooling design (e.g., preform relief), fiber preforming and preform assembly ultimately controls the fiber volume and nesting void fraction within the resultant composite structure. Restraint of the compacted channel fiber preform segments against the inner fiber preform may be accomplished by tightly hoop wrapping the ends of the channel mandrel segments with a suitable reinforced tape or string. It is preferable to restrain the tooling/preform sub-assembly in the end region of excess length as these ends can be trimmed away and discarded following preform consolidation and matrix densification processing.

Figures 6A, 6B, 6C:
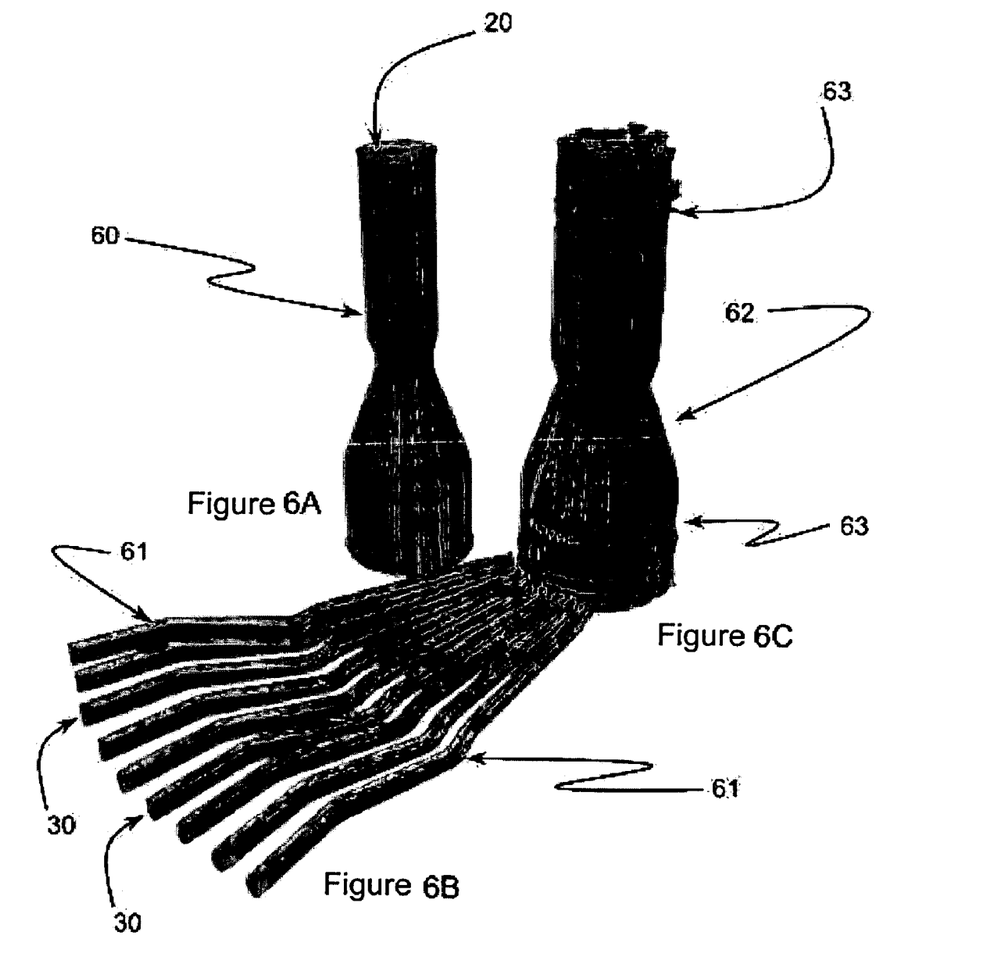
FIG. 6A shows a fibrous preform overlaid onto an inner tooling mandrel of converging-diverging geometry.
FIG. 6B shows a plurality of fibrous preforms overlaid onto the individual cooling channel tooling mandrel segments of converging-diverging geometry.
FIG. 6C shows a fibrous preform sub-assembly of converging-diverging geometry comprising a plurality of preformed cooling channel tooling mandrel segments disposed about the preformed inner tooling mandrel.

FIG. 6A shows the inner tooling mandrel 20 having an overlaid fibrous preform 60, which forms the reinforcement of the inner wall 11 of the ceramic matrix composite structure 10. FIG. 6B shows a number of cooling channel mandrel segments 30 having overlaid fibrous preforms 61 which form the reinforcement of the individual cooling channels 12 of the ceramic matrix composite structure 10. FIG. 6C shows the assembly of individual cooling channel mandrel segments 30 having overlaid fibrous preforms 61 disposed around the inner tooling mandrel 20 and inner fibrous preform 60. Compacting and securing the individual cooling channel fibrous preform segments 61 against the inner fibrous preform 60 as a fibrous preform sub-assembly 62 is provided by hoop-wrapping 63 the excess ends of the individual cooling channel mandrel segments 30.

Figure 7:
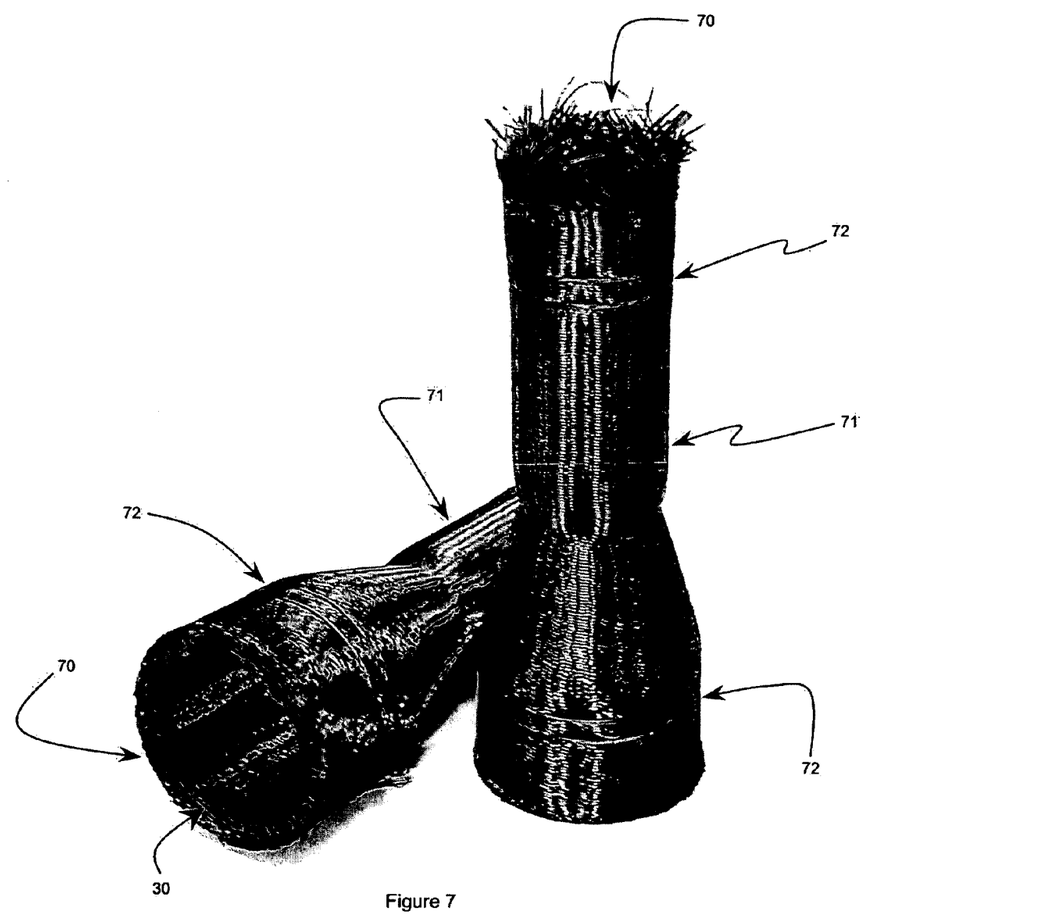
FIG. 7 shows a pair of fully completed fibrous preform assemblies constructed in accordance with the present invention shown with the inner tooling mandrel removed for illustration.

Once the fiber preform sub-assembly 62 has been fabricated, it is then overlaid with an outer fibrous preform by a suitable textile fabrication process, such as braiding. The outer fibrous preform will thus conform to the geometry of the underlying tooling/preform sub-assembly 62. FIG. 7 shows a completed converging-diverging thrust chamber tooling/fibrous preform assembly 70 (inner tooling mandrel 20 removed for illustration) ready for subsequent fiber coating and matrix densification. For ease of handling in preparation for subsequent fiber coating and/or matrix consolidation processing, the entire fibrous preform assembly 70 can also be restrained by hoop wrapping the excess ends with a suitable reinforced tape or string 72, again, as these ends can eventually be trimmed away and discarded. The outer fibrous preform 71 forms the outer wall 14 of the actively-cooled ceramic matrix composite structure 10 produced. Thus, the fabrication of the fibrous preform 70 corresponding to the desired actively-cooled tubular structure 10 to be produced is completed following the deposit of the outer fiber preform 71 onto the underlying fibrous preform sub-assembly 62.

Following fabrication of the fibrous preform assemblage 70, a fiber coating or fiber coating system is deposited (for example by chemical vapor infiltration) onto the entire tooling/preform assembly 70. If the reinforcing fibers have been coated prior to preforming, this processing step may not be necessary. As previously described, the fiber coating serves to control the desired fiber/matrix interfacial compliance and bonding characteristics in the resultant ceramic matrix composite structure produced. Examples of suitable fiber-coating materials include pyrplytic carbon, silicon carbide, silicon nitride, boron carbide, boron nitride, etc., either as a single layer phase, multilayered phase or as a phase of mixed composition.

Following the application of the fiber coating or fiber coating system, a ceramic matrix is deposited (for example by chemical vapor infiltration) onto the entire tooling/preform assembly 70. The process of matrix deposition using chemical vapor infiltration is well known in the art and is also described in U.S. Pat. No. 5,455,106 and Applicant's co-pending patent application having Attorney Docket Number 260/175, the disclosures of which are incorporated herein by reference in their entirety. It can be appreciated that other matrix processing techniques (e.g., polymer impregnation/pyrolysis, melt infiltration, etc.) can be utilized for densification of the fibrous preform assembly 70 without departing from the scope of the present invention. Depending on the method of matrix deposition processing employed, consolidation of the fibrous preform assembly 70 can be performed in two sequential steps. The first processing step involves the application of a small volume fraction of matrix to stiffen or rigidize the fibrous preform assembly 70. A properly rigidized fiber preform assembly 70 lacks flexibility and is sufficiently stiff enough to be handled and further processed without the aid of external fixturing and/or tooling for stabilizing and maintaining the desired component geometry. The amount of deposited matrix necessary to adequately rigidize the preform assembly 70 is dependent on the matrix composition and processing method employed. Following initial rigidization, the inner tooling mandrel 20 may then be removed to enable consolidation to commence on the free-standing fibrous preform assembly 70 as shown in FIG. 7. Early removal of the inner tooling mandrel 20 following initial rigidization facilitates easy mandrel extraction in addition to mandrel reusability and enhanced matrix densification processing economics. However, for complex geometries (e.g., converging-diverging) and/or helical or sinusoidal cooling channel designs, the individual cooling channel mandrel segments 30 must remain captive within the fibrous preform assembly 70 due to their convoluted geometry. Should straight axial cooling channel mandrel segments be chosen, such as that suitable for actively-cooled right cylindrical or tapered cylindrical tubes, these mandrels may be effectively removed at this step, as they may not be geometrically captured within the preform. Thus, removal of the individual cooling channel mandrel segments is dependent on the geometry of the cooling channel mandrels chosen which, is dependant on the application for which the actively-cooled ceramic matrix composite structure is intended.

The second processing step following the removal of the inner mandrel 20 is that of preform consolidation. Consolidation of the rigid, yet still highly porous preform assembly 70 with a ceramic matrix is thus performed until a zero or near-zero residual open porosity level is attained in the resultant composite. The reinforcing fibers of the inner fibrous preform 60, outer fibrous preform 71, and cooling channel fibrous preforms 61 thus become embedded within, supported by and fused to the surrounding matrix. Examples of suitable matrix materials include pyrolytic carbon, silicon carbide, silicon nitride, boron carbide, boron nitride, etc., either as a single-layer phase, multilayered phase or as a phase of mixed composition.

Figure 8:
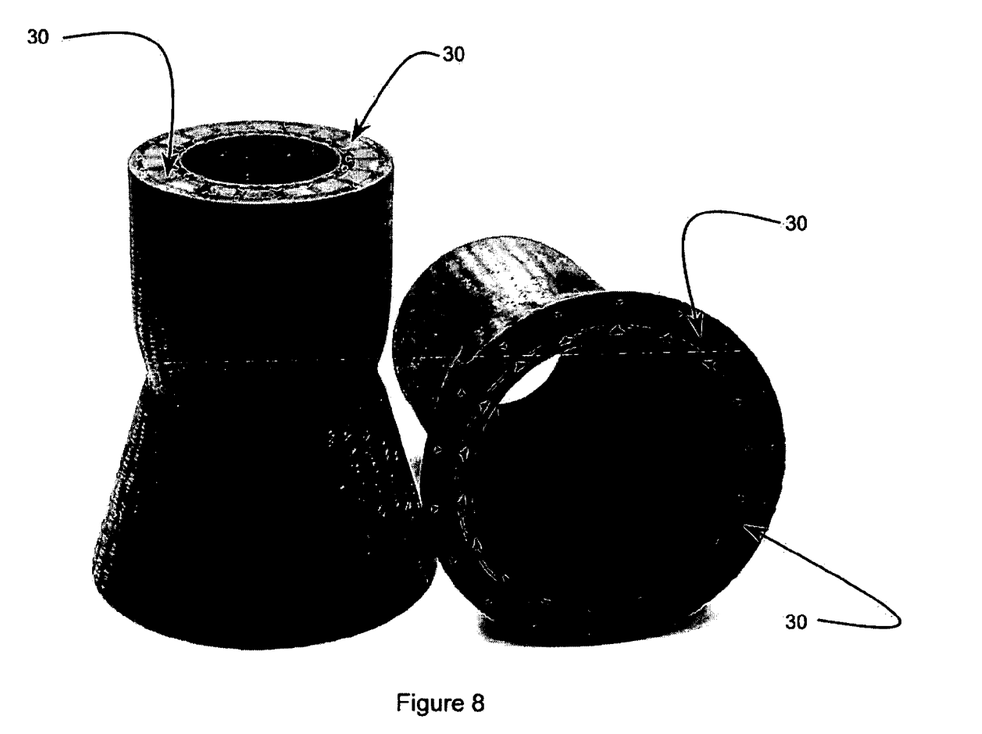
FIG. 8 shows a pair of densified fiber-reinforced ceramic matrix composite rocket propulsion thrust chamber structures of converging-diverging geometry shown prior to the removal of the plurality of embedded cooling channel tooling mandrel segments.

Following matrix densification processing, the densified actively-cooled ceramic matrix composite structure is prepared for either rough or final detailed machining and cooling channel tooling mandrel removal. Rough machining involves removing the excess material length used initially for assembling and restraining the fibrous preform from both ends of the actively-cooled ceramic matrix composite tubular structure. Rough machining/trimming can be performed using standard diamond cutting saw machining techniques. The trim end remnants are thus removed from the densified ceramic matrix composite structure and discarded. FIG. 8 shows a near-densified ceramic matrix composite thrust chamber structure of converging-diverging geometry which has undergone rough machining. Cutting off the ends of the actively-cooled ceramic matrix composite structure, as shown in FIG. 8, exposes the ends of the embedded cooling channel mandrel segments 30, which is necessary for their removal in the case of cooling channels having convoluted geometry (e.g., converging-diverging).

The method of removing the embedded cooling channel mandrels segments 30 is dependent on the tooling material employed for fabrication of the base cooling channel mandrel 40. Graphite cooling channel mandrels 30 can be removed by either oxidation or grit blasting. For composite materials not composed of carbon or other low oxidation threshold constituents (e.g., reinforcing fiber, fiber coating or matrix) oxidative combustion of graphite mandrels is performed by thermally conditioning the composite structure in a furnace heated to at least 425° C. in an ambient (air) environment. The rate of mandrel removal can be accelerated with increased conditioning temperatures and/or increased oxygen partial pressures. Conditioning temperatures and oxidizing atmospheres should be maintained well under that necessary to cause thermochemical (e.g., oxidation) or thermomechanical degradation of the ceramic matrix composite material.

For ceramic matrix composite materials of sufficient erosion resistance (e.g., high hardness and strength), grit blasting is a viable alternative to oxidative combustion for rapid removal of graphite cooling channel mandrels 30. Because of its combination of low hardness and strength, bulk graphite exhibits very low resistance to hard particle erosion. Blast media and delivery pressures are selected based on providing the most aggressive erosive removal of the mandrels without imparting erosive damage or compositional contamination to the adjacent composite material. Small diameter orifice nozzles combined with nozzle extensions can be used to enable access down the otherwise long, slender and convoluted channel passages 12.

Metallic cooling channel mandrels 30 can be effectively removed by acid digestion. For ceramic matrix composite materials composed of constituents which are chemically compatible with suitable etching acids (e.g., nitric acid), dissolution of metallic cooling channel mandrel segments 30 is performed by submerging the composite structure into an acid bath. The rate of mandrel removal can be accelerated with increased acid bath temperatures and/or increased acid concentrations or aggressive acid mixtures. For very long and slender channel passages 12, cyclic pressure or vacuum pulsing of a digestive bath system aids in the accelerated removal of high aspect ratio cooling channel mandrel segments 30.

Following removal of the embedded cooling channel mandrels 30, final detailed machining is performed on the densified ceramic matrix composite structure to satisfy specific geometric and dimensional tolerance requirements (e.g., parallelism and flatness of the free ends, chamfering or beveling of sharp edges, and/or lathe turning of the inner and/or outer diameter(s) to incorporate provisional details for coolant manifold integration, etc.). Detailed machining is typically performed using standard diamond grinding techniques.

Figure 9:
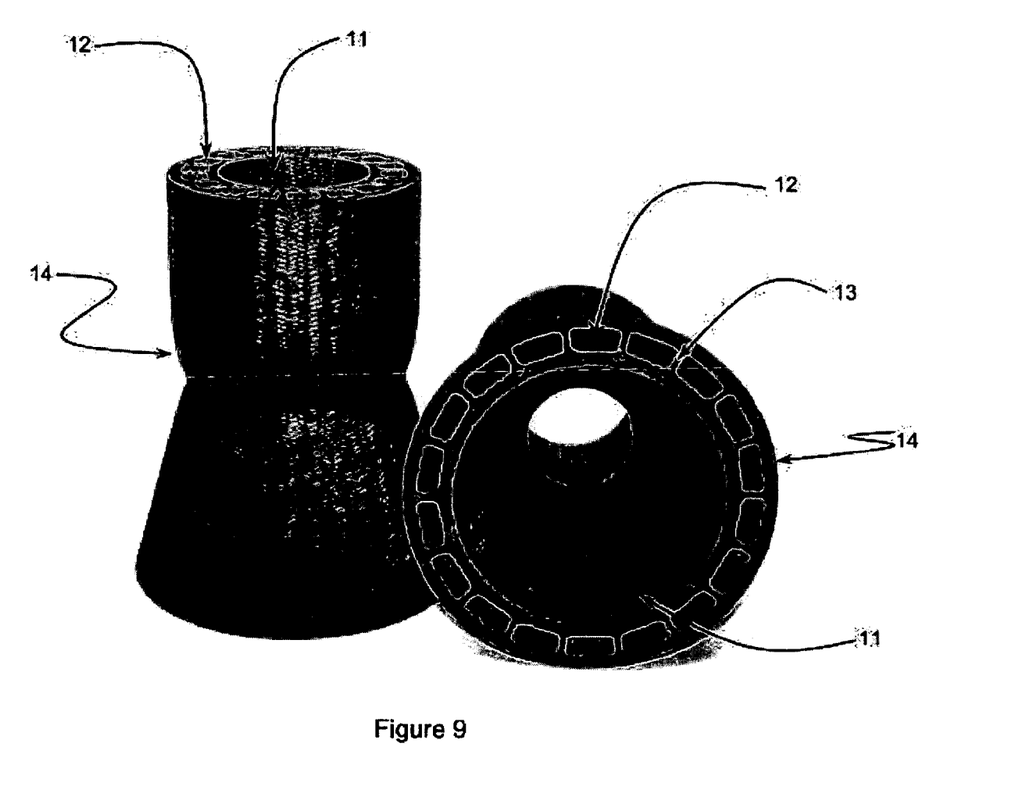
FIG. 9 shows a pair of densified fiber-reinforced ceramic matrix composite rocket propulsion thrust chamber structures of converging-diverging geometry wherein the plurality of cooling channel tooling mandrel segments have been removed.

Following removal of the individual cooling channel mandrel segments 30 and final machining, the actively-cooled ceramic matrix composite structure 10 is preferably processed with a final matrix seal coating. Seal-coat processing as a final step in the fabrication of the actively-cooled ceramic matrix composite structure serves to over-coat the freshly exposed interior walls of the cooling channel passages 12 as well as providing an environmentally protective coating on free-edge surfaces freshly exposed from cutting and final machining. FIG. 9 shows a completed actively-cooled fiber-reinforced ceramic matrix composite thrust chamber structure 10 of converging-diverging geometry.

EXAMPLE

The present invention will now be described with reference to a specific example comprising the fabrication of an actively-cooled fiber-reinforced ceramic matrix composite thrust chamber of converging-diverging geometry using the methods previously described. For this example, a simple axially oriented cooling channel design is selected for purposes of demonstrating the manufacturing methods of the current invention. The example thrust chamber is produced with a 50.8 mm diameter cylindrical combustion chamber, a 25.4 mm throat, a 101.6 mm diameter conical exhaust (expansion) nozzle, and is 203.2 mm in overall length. The convergent and divergent sections are of simple conical geometry, both with a half angle of 20-degrees with respect to the longitudinal axis. The ceramic matrix composite structure is designed to safely sustain combustion chamber pressures and coolant delivery pressures of up to 7.5 Mpa and 11.2 Mpa, respectively. The axial heat exchanger circuit is designed to reduce the combustion chamber inner wall temperature from over 3,600° C. to less than 1,650° C. using cryogenic liquid hydrogen coolant delivered at a temperature of −220° C. and flow rate of 0.45 kg/sec.

The material system selected for demonstrating the actively-cooled thrust chamber design and manufacturing methodology is a braided Hi-Nicalon silicon carbide (SiC) fiber-reinforced CVI-SiC ceramic matrix composite (SiC/SiC). The SiC/SiC composite material system is selected for its high thru-thickness thermal conductivity, negligible thru-the-thickness permeability, and inherent oxidation resistance. Continuous Hi-Nicalon SiC fiber is selected as the structural reinforcement for its excellent thermal expansion compatibility with the CVI-derived SiC matrix and adequate high-temperature mechanical properties. A braided perform architecture is selected because of its amenability for producing high-performance axisymmetric tubular structures and tailorable in-plane (e.g., axial and circumferential) mechanical properties.

Tooling mandrels (e.g., inner mandrel and cooling channel mandrel segments) for the example thrust chamber are fabricated from fine-grain, high-density bulk graphite. Bulk graphite is selected as the tooling material for its outstanding compatibility with the CVI-based PyC and SiC processes and low cost. The example thrust chamber design requires eighteen (18) individual channel mandrel segments, each sectioned at 20-degree intervals. All tooling mandrels are fabricated with adequate additional trim length for preform fabrication, assembly, compaction, and restraint for reasons previously described.

For this example, a biaxially braided Hi-Nicalon SiC fiber preform is selected for its combination of high volumetric loading of fiber reinforcement, excellent hoop properties and overall design simplicity. The fibrous preform is produced by braiding four (4) fabric-like layers in succession onto the inner split mandrel and four (4) fabric-like layers onto each of the eighteen (18) cooling channel mandrel segments. The selected braid bias (helix) angle of the fiber reinforcement in each preform layer is approximately ±60-degree with respect to the thrust chamber longitudinal axis. The ±60-degree fiber architecture is selected for its near-optimum balance of axial and hoop mechanical properties desired for axisymmetric composite pressure vessel structures.

Following the fiber preforming process, the eighteen (18) channel segments are disposed around and assembled onto the inner mandrel in an annular array. The assemblage is radially compacted and secured using a tight wrap of heavy-duty carbon yarn. FIG. 6 shows a photograph of the braided inner mandrel, nine (9) of the eighteen (18) required cooling channel mandrel segments and the resultant sub-assembly of the respective fibrous preforms. The entire tooling/preform sub-assemblage is then overlaid with six (6) additional ±60-degree braid layers, thereby completing the actively-cooled thrust chamber fibrous preform assembly.

The initial CVI processing step is the application of a suitable fiber coating onto the fibrous preform assembly. As previously discussed, a fiber coating is required to impart the necessary fiber/matrix interfacial mechanical characteristics (e.g., low interfacial shear strength) to promote high strength and toughness in the resulting composite. The selected fiber coating for this example is a two-layer, duplex coating system comprised of a first ~0.4 μm debond layer of pyrolytic carbon (PyC) followed by a second ~0.6 μm oxidation-barrier layer of boron carbide ($B_4C$) produced by CVI methods.

The CVI-derived PyC fiber coating is produced in a high-temperature, low-pressure chemical vapor infiltration (CVI) reactor by the thermal decomposition of a hydrocarbon-containing gas in the presence of hydrogen at an elevated temperature of 950-1250° C. and at a reduced pressure of 1-250 Torr according to the following chemical reaction:

$1/nC_nH_m + \alpha H_2 \rightarrow C + (m/2n+\alpha)H_2$, where $C_nH_m$ is the gaseous hydrocarbon reactant (e.g., methane, propane, propylene etc.) and α is defined as the molar ratio of $H_2$ to $C_nH_m$.

The next processing step is the application of the outer $B_4C$ oxidation-barrier coating produced by the CVI co-deposition of boron (B) from boron trichloride ($BCl_3$) and carbon (C) from a suitable hydrocarbon gas using hydrogen as a carrier at an elevated temperature of 800-1100° C. and at a reduced pressure of 1-250 Torr according to the following chemical reaction:

$4BCl_3 + 1/nC_nH_m + \alpha H_2 \rightarrow B_4C + 12HCl + (m/2n+\alpha-6)H_2$, where 4n is the molar ratio of $BCl_3$ to $C_nH_m$, which is controlled to produce a near-stoichiometric $B_4C$ coating composition at a given processing condition.

The next CVI processing step is the rigidization of the fibrous preform with a ceramic matrix. The selected matrix constituent for this example is SiC for reasons previously discussed. The CVI SiC matrix is produced by the thermal decomposition of vaporized methyltrichlorosilane (MTS) using hydrogen as a carrier gas at an elevated temperature of 850-1150° C. and at a reduced pressure of 1-250 Torr according to the following chemical reaction:

$CH_3SiCl_3 + \alpha H_2 \rightarrow SiC + 3HCl + \alpha H_2$, where α is defined as the molar ratio of $H_2$ to $CH_3SiCl_3$.

Following the initial deposition of the SiC matrix, the rigidized fiber preform is prepared for removal of the inner split mandrel prior to complete matrix densification processing. The CVI-derived SiC matrix typically bridges between the fibrous preform in physical contact with the adjacent inner tooling mandrel. This results in a slight, but easily frangible bonding of the fibrous preform to the adjacent mandrel. Removal of the split mandrel is performed by first removing the threaded axial tie bolt from the inner mandrel assembly. The SiC coating bond is then breached from the surrounding preform and inner mandrel and the opposing tools are then extracted from their respective ends of the preform assembly. FIG. 7 shows a photograph of the rigidized thrust chamber preform with the inner split mandrel removed.

Consolidation processing of the free-standing fibrous preform with the SiC matrix is then performed until a near-zero residual open porosity level is attained in the composite.

After achieving near-final densification, rough machining is performed by trimming the excess material length from both ends of the ceramic matrix composite thrust chamber component using a diamond-bladed cutting saw. Removal of the excess material exposes the ends of the individual graphite cooling channel mandrel segments, which remain captive within the dense composite structure. FIG. 8 shows a photograph of the densified ceramic matrix composite thrust chamber following removal of the trim ends.

Since the selected SiC/SiC composite is much harder and far more erosion-resistant than the selected graphite tooling material, the embedded cooling channel mandrel segments are easily removed by grit blasting methods. Commercially available borosilicate glass bead media provides adequate erosive qualities for removing the embedded graphite mandrels without inducing damage or contamination to the surrounding ceramic matrix composite material. Media delivery pressures of up to 0.7 MPa are satisfactory for the rapid removal of the graphite mandrels without damaging the underlying ceramic matrix composite material. Grit blasting is best performed using a long, slender tubular nozzle extension to enable unobstructed access through the narrow convoluted cooling channel passages of the structure.

After complete removal of the graphite channel tooling mandrels, the ceramic matrix composite thrust chamber is further processed with an additional SiC matrix infiltration/densification step. This processing step serves, in part, to densify and coat the freshly exposed interior walls of the cooling channel passages. Matrix processing is thus performed until a zero residual open porosity level is attained in the resultant composite. A zero open porosity level in the composite represents the maximum degree of densification achievable by CVI processing methods, as the chemical reactants no longer have diffusional access to the interior of the material via open porosity.

Detailed machining is then performed on the fully densified composite thrust chamber as necessary to satisfy specific geometric and dimensional tolerance requirements. Such requirements may include parallelism and flatness of the free ends, chamfering or beveling of sharp edges, and/or turning of the inner and/or outer diameter(s) to incorporate provisional details for external coolant manifold integration.

The final processing step in the manufacture of the actively-cooled ceramic matrix composite thrust chamber is that of CVI SiC "seal coating". Seal coat processing as a final step in the fabrication of the composite thrust chamber serves to provide an environmentally-protective SiC over-coat to all surfaces exposed from detailed machining, as previously described. The CVI SiC seal coating is produced by the thermal decomposition of vaporized methyltrichlorosilane (MTS) using hydrogen as a carrier gas at an elevated temperature of 850-1150° C. and at a reduced pressure of 1-250 Torr according to the following chemical reaction:

$$CH_3Sicl_3 + \alpha H_2 \rightarrow SiC + 3HCl + \alpha H_2,$$

where $\alpha$ is defined as the molar ratio of $H_2$ to $CH_3SiCl_3$.

FIG. 9. shows a photograph of a fully completed actively-cooled SiC/SiC composite thrust chamber produced by the manufacturing methods described herein.

I claim:

1. A method for manufacturing a ceramic matrix composite tubular shell structure having an inner wall, an outer wall and a plurality of cooling channel passages formed between said inner wall and said outer wall, wherein said ceramic matrix composite tubular shell structure is manufactured by the steps comprising:
   a. fabricating an inner tooling mandrel for defining the inside geometry of said inner wall;
   b. fabricating a plurality of cooling channel tooling mandrel segments for defining the inside geometry of said plurality of cooling channel passages of said tubular shell structure;
   c. fabricating a fibrous preform of refractory reinforcing fibers;
   d. depositing a fiber coating onto said fibrous preform which fully encapsulates the refractory reinforcing fibers thereof;
   e. depositing a ceramic matrix material onto said fibrous preform to fully encapsulate and consolidate said coated fibrous preform into a densified fiber reinforced ceramic matrix composite material;
   f. removing said inner tooling mandrel and said plurality of cooling channel tooling mandrel segments from said densified ceramic matrix composite tubular shell structure;
   g. machining said densified ceramic matrix composite tubular shell structure; and
   h. depositing a ceramic seal coating material onto said densified ceramic matrix composite tubular shell structure following said machining of said tubular shell structure.

2. The method for manufacturing a ceramic matrix composite tubular shell structure recited in claim 1, wherein the said inner tooling mandrel and said plurality of cooling channel tooling mandrel segments are fabricated from a material selected from the group consisting of graphite, molybdenum and steel.

3. The method for manufacturing a ceramic matrix composite tubular shell structure recited in claim 1, wherein said fibrous preform is fabricated from an assemblage of individual fiber preform elements produced by a textile fabrication process selected from the group consisting of weaving, braiding, knitting, fiber placement, filament winding, felting, and needling.

4. The method for manufacturing a ceramic matrix composite tubular shell structure recited in claim 1, comprising the additional step of forming an inner wall fiber preform element onto said inner tooling mandrel, wherein said inner wall fiber preform element is produced by a textile fabrication process selected from the group consisting of weaving, braiding, knitting, fiber placement, filament winding, felting, and needling.

5. The method for manufacturing a ceramic matrix composite tubular shell structure recited in claim 1, comprising the additional step of forming an outer wall fiber preform element onto said fibrous preform sub-assembly to fabricate said fibrous preform, wherein said outer wall fiber preform element is produced by a textile fabrication process selected from the group consisting of weaving, braiding, knitting, fiber placement, filament winding, felting, and needling.

6. The method for manufacturing a ceramic matrix composite tubular shell structure recited in claim 1, wherein said inner tooling mandrel has a geometric profile.

7. The method for manufacturing a ceramic matrix composite tubular shell structure recited in claim 6, wherein said ceramic matrix composite tubular shell structure comprises an actively-cooled heat exchanger tube having a cylindrical shape and said inner tooling mandrel has a corresponding cylindrical geometric profile.

8. The method for manufacturing a ceramic matrix composite tubular shell structure recited in claim 6, wherein said ceramic matrix composite tubular shell structure comprises an actively-cooled rocket propulsion thrust chamber having a converging-diverging shape and said inner tooling mandrel has a corresponding converging-diverging geometric profile.

9. The method for manufacturing a ceramic matrix composite tubular shell structure recited in claim 8, wherein said inner tooling mandrel having said converging-diverging geometric profile comprises a 2-piece assembly which is split at the location of minimum diameter and secured by a bolted fastener.

10. The method for manufacturing a ceramic matrix composite tubular shell structure recited in claim 1, wherein said plurality of cooling channel tooling mandrel segments are fabricated by the steps comprising:
    a. forming a base tubular tooling mandrel having generally independent inner and outer geometric profiles corresponding to the cross-sectional dimensions of the plurality of cooling passages; and
    b. sectioning said base tubular tooling mandrel at periodic angular intervals to produce said plurality of cooling channel tooling mandrel segments.

11. The method for manufacturing a ceramic matrix composite tubular shell structure recited in claim 10, wherein the inner geometric profile of said base tubular tooling mandrel conforms to the geometric profile of said inner tooling mandrel and incorporates a radial gap to accommodate the thickness of said fibrous preform.

12. The method for manufacturing a ceramic matrix composite tubular shell structure recited in claim 10, wherein said plurality of cooling channel tooling mandrel segments are fabricated by the additional step of cutting said base tubular tooling mandrel at periodic intervals with a kerf width corresponding to the thickness of said fibrous preform of refractory reinforcing fibers.

13. The method for manufacturing a ceramic matrix composite tubular shell structure recited in claim 10, wherein the step of sectioning said base tubular tooling mandrel includes the additional step of cutting said base tubular tooling mandrel at periodic intervals to produce a plurality of like axially extending cooling channel tooling mandrel segments.

14. The method for manufacturing a ceramic matrix composite tubular shell structure recited in claim 10, wherein the step of sectioning said base tubular tooling mandrel includes the additional step of cutting said base tubular tooling mandrel at periodic intervals to produce a plurality of helically spiraling cooling channel tooling mandrel segments.

15. The method for manufacturing a ceramic matrix composite tubular shell structure recited in claim 10, wherein the step of sectioning said base tubular tooling mandrel includes the additional step of cutting said base tubular tooling mandrel at periodic intervals to produce a plurality of sinusoidally undulating cooling channel tooling mandrel segments.

16. The method for manufacturing a ceramic matrix composite tubular shell structure recited in claim 1, comprising the additional step of forming a plurality of cooling channel fiber preform elements onto respective ones of said plurality of cooling channel tooling mandrel segments, wherein said plurality of cooling channel fiber preform elements are produced by a textile fabrication process selected from the group consisting of weaving, braiding, knitting, fiber placement, filament winding, felting, and needling.

17. The method for manufacturing a ceramic matrix composite tubular shell structure recited in claim 16, wherein said plurality of cooling channel fiber preform elements are disposed around said inner wall fiber preform element in an annular array.

18. The method for manufacturing a ceramic matrix composite tubular shell structure recited in claim 17, wherein said plurality of cooling channel fiber preform elements disposed around said inner wall fiber preform element in an annular array are compacted firmly against said inner wall fiber preform element and secured by a tight wrapping of tape to thereby form a fibrous preform sub-assembly.

19. The method for manufacturing a ceramic matrix composite tubular shell structure recited in claim 1, wherein the fiber coating deposited on said fibrous preform has a thickness of 0.05-5.0 micrometers and is produced by a process selected from the group consisting of chemical vapor infiltration (CVI), polymer precursor impregnation/pyrolysis (PIP), reaction formation, and combinations thereof.

20. The method for manufacturing a ceramic matrix composite tubular shell structure recited in claim 19, wherein the fiber coating deposited on said fibrous preform is carbon produced by chemical vapor infiltration (CVI) using a carbon-forming precursor selected from the group consisting of methane, propane, propylene, and mixtures thereof, which is pyrolytically decomposed into carbon at an elevated temperature of 950-1250° C. and at a reduced pressure of 1-250 Torr.

21. The method for manufacturing a ceramic matrix composite tubular shell structure recited in claim 19, wherein said fibrous preform is first coated with carbon followed by a boron carbide coating produced by chemical vapor infiltration (CVI) using a boron carbide-forming precursor selected from the group consisting of boron trichloride, boron triflouride, diborane, and mixtures thereof, which is reacted with a carbon-forming precursor selected from the group consisting of methane, propane, propylene, and mixtures thereof to form boron carbide at an elevated temperature of 800-1100° C. and at a reduced pressure of 1-250 Torr.

22. The method for manufacturing a ceramic matrix composite tubular shell structure recited in claim 1, wherein said fiber coated fibrous preform is consolidated with a ceramic matrix material produced by a process selected from the group consisting of chemical vapor infiltration (CVI), polymer precursor impregnationlpyrolysis (PIP), melt infiltration (MI), reaction formation, and combinations thereof, which fully encapsulates said coated reinforcing fibers of said fibrous preform for transforming said fibrous preform into a dense, ceramic matrix composite structure.

23. The method for manufacturing a ceramic matrix composite tubular shell structure recited in claim 22, wherein said ceramic matrix material is silicon carbide produced by chemical vapor infiltration (CVI) using a silicon carbide-forming precursor selected from the group of silicon carbide-forming precursors consisting of methyltrichlorosilane, dimethyldichlorosilane, and mixtures of silicon tetrachioride with methane, and mixtures thereof, which is reacted to form silicon carbide at an elevated temperature of 850-1150° C. and at a reduced pressure of 1-250 Torr.

24. The method for manufacturing a ceramic matrix composite tubular shell structure recited in claim 1, wherein said plurality of cooling channel tooling mandrel segments which define the inside geometry of said plurality of cooling channel passages are destructively removed from said ceramic matrix composite tubular shell structure by a process selected from the group consisting of acid digestion, oxidation and grit blasting.

25. The method for manufacturing a ceramic matrix composite tubular shell structure recited in claim 24, wherein said plurality of cooling channel tooling mandrel segments are fabricated from graphite and are destructively removed from said ceramic matrix composite tubular shell structure by a process selected from the group consisting of oxidation and grit blasting.

26. The method for manufacturing a ceramic matrix composite tubular shell structure recited in claim 24, wherein said plurality of cooling channel tooling mandrel segments are fabricated from metal and are destructively removed from said ceramic matrix composite tubular shell structure by a process including acid digestion.

27. The method for manufacturing a ceramic matrix composite tubular shell structure recited in claim 1, wherein said densified fiber reinforced ceramic matrix composite tubular shell structure is seal coated with said ceramic seal coating material following removal of said inner tooling mandrel and said plurality of cooling channel tooling mandrel segments from said ceramic matrix composite tubular shell structure, said ceramic seal coating material produced by a process selected from the group consisting of chemical vapor infiltration (CVI), polymer precursor impregnationlpyrolysis (PIP), melt infiltration (MI), reaction formation, and combinations thereof.

28. The method for manufacturing a ceramic matrix composite tubular shell structure recited in claim 27, wherein said densified fiber reinforced ceramic matrix composite tubular shell structure is seal coated with silicon carbide produced by chemical vapor infiltration (CVI) using a silicon carbide-forming precursor selected from the group of silicon carbide-forming precursors consisting of methyltrichlorosilane, dimethyldichlorosilane, and mixtures of silicon tetrachioride with methane, which is reacted to form silicon carbide at an elevated temperature of 850-1150° C. and at a reduced pressure of 1-250 Torr.

* * * * *